United States Patent
Balakrishnan et al.

(10) Patent No.: US 10,659,323 B2
(45) Date of Patent: May 19, 2020

(54) METHOD AND APPARATUS FOR IMPROVING BROADBAND EXPERIENCE USING CLOUD BASED RECOMMENDATION ENGINE

(71) Applicant: ADAPTIVE SPECTRUM AND SIGNAL ALIGNMENT, INC., Redwood City, CA (US)

(72) Inventors: Manikanden Balakrishnan, Foster City, CA (US); Wooyul Lee, Palo Alto, CA (US); Sungho Yun, Cupertino, CA (US); Carlos Garcia Hernandez, Campbell, CA (US); Ramya Bhagavatula, Mountain View, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 455 days.

(21) Appl. No.: 15/315,348

(22) PCT Filed: May 30, 2014

(86) PCT No.: PCT/US2014/040402
§ 371 (c)(1),
(2) Date: Nov. 30, 2016

(87) PCT Pub. No.: WO2015/183323
PCT Pub. Date: Dec. 3, 2015

(65) Prior Publication Data
US 2017/0201432 A1 Jul. 13, 2017

(51) Int. Cl.
*G06F 15/173* (2006.01)
*H04L 12/26* (2006.01)
(Continued)

(52) U.S. Cl.
CPC .............. *H04L 43/04* (2013.01); *G06F 16/22* (2019.01); *G06N 5/02* (2013.01); *H04L 12/12* (2013.01);
(Continued)

(58) Field of Classification Search
USPC ........................................................ 709/224
See application file for complete search history.

(56) References Cited

U.S. PATENT DOCUMENTS 7,925,729 B2 * 4/2011 Bush .................. H04L 12/2807
709/223
2012/0134397 A1 * 5/2012 Cioffi .................. H04L 12/2856
375/222

(Continued)

FOREIGN PATENT DOCUMENTS

EP 2680494 A1 1/2014
EP 2720409 A1 4/2014
(Continued)

OTHER PUBLICATIONS

Communication Pursuant to Article 94(3) EPC dated May 24, 2018, in European Patent Application No. 14893025.8 (8pgs).
(Continued)

*Primary Examiner* — Atta Khan
(74) *Attorney, Agent, or Firm* — Michael North; North Weber & Baugh LLP (57) ABSTRACT

Described is a method performed by a computing device for controlling home network system associated with a plurality of Wi-Fi communicating devices, the method comprising: analyzing operational data associated with the plurality of Wi-Fi communicating devices, the operational data collected from plurality of Wi-Fi communicating devices; providing (or generating) recommendations for improving performance of the home network system according to the
(Continued)

analyzed operational data; correlating the recommendations into groups; and aggregating the recommendations from the groups to generate unified recommendations for improving the home network system.

23 Claims, 4 Drawing Sheets

(51) Int. Cl.
    *G06F 16/22* (2019.01)
    *H04L 12/12* (2006.01)
    *H04L 12/24* (2006.01)
    *H04W 4/50* (2018.01)
    *G06N 5/02* (2006.01)
    *H04L 12/28* (2006.01)
    *H04L 29/08* (2006.01)
    *H04W 84/12* (2009.01)

(52) U.S. Cl.
    CPC ...... *H04L 12/2825* (2013.01); *H04L 41/0893* (2013.01); *H04L 43/08* (2013.01); *H04L 67/10* (2013.01); *H04L 67/22* (2013.01); *H04W 4/50* (2018.02); *H04L 41/046* (2013.01); *H04W 84/12* (2013.01); *Y02D 50/30* (2018.01); *Y02D 50/40* (2018.01)

(56) References Cited

U.S. PATENT DOCUMENTS

| | | | |
|---|---|---|---|
| 2012/0179811 A1* | 7/2012 | Eicken | H04L 41/22 709/224 |
| 2013/0006912 A1 | 1/2013 | Christie, IV et al. | |
| 2013/0204740 A1* | 8/2013 | Barbieri | G06Q 30/02 705/26.7 |
| 2013/0205016 A1* | 8/2013 | Dupre | H04L 41/0896 709/224 |

FOREIGN PATENT DOCUMENTS

| | | |
|---|---|---|
| KP | 1020120019133 | 3/2012 |
| WO | 2013070232 | 5/2013 |

OTHER PUBLICATIONS

International Preliminary Report on Patentability for International Application No. PCT/US2014/040402, dated Dec. 15, 2016.
International Search Report and Written Opinion, dated Feb. 4, 2015, for PCT Patent Application No. PCT/US2014/040402.
Extended European Search Report dated Sep. 27, 2017, in European Patent Application No. 2014893025 (9pgs).

* cited by examiner

301
Collect current operational data associated with the plurality of Wi-Fi communicating devices

302
Collect historical operational data associated with the plurality of WiFi communicating devices

303
Analyze the collected current and historical operational data associated with the plurality of Wi-Fi communicating devices

304
Provide individual recommendations for each of the plurality of Wi-Fi communicating devices for improving performance of the home network service according to the analyzed collected current and historical operational data

305
Correlate recommendations for improving home network service into groups

306
Consolidate the correlated recommendations from the groups to generate unified recommendations for improving the home network service

METHOD AND APPARATUS FOR IMPROVING BROADBAND EXPERIENCE USING CLOUD BASED RECOMMENDATION ENGINE

BACKGROUND

In current practice, Wide Area Network (WAN) and/or Local Area Network (LAN) performance information is not centrally analyzed by a communication device coupled to such networks to account for information such as historical information, knowledge of network component (or network structure) to enable grouping, or to understand the correlation of information, etc. Lack of a central analysis may also result in the communication devices (e.g., a smart phone, computer, a router, etc.) operating with lower performance than otherwise possible because the communication devices have no means for knowing performance data that can be used to intelligently assess and manage performance of the communication device and/or network connection.

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Users of broadband service often get frustrated with problems with the broadband network. For example, unexpected slowing down of the network increases time to download a movie from the Internet which hampers down user broadband experience. Fixing network and performance problems is hard, particularly if the network comprises several devices accessing the broadband network through a combination of fixed and wireless links. Examples of fixed links include Digital Subscriber Line (DSL). Examples of wireless links include Wi-Fi. Going beyond the basic troubleshooting methods, users are provided with understandable diagnosis and actionable recommendations to fix their problems and enhance the overall broadband experience, according to one embodiment. In one embodiment, centralized cloud based recommendation engine is used to provide scope for actionable recommendations based on one or more factors such as long-term behavior, aggregated or correlated behavior, overall quality of experience (QoE), etc.

Here, long-term behavior refers to historical user behavior i.e., to maintain historical benchmarks for all components of the broadband network (e.g. the maximum wireless throughput historically recorded for a device). The real-time data may be compared against those historical benchmarks to recommend better fixes for the user. Here, aggregated/correlated behavior refers to identifying similar device networking behavior into groups i.e., to analyze multiple components of the broadband network together and provide consolidated recommendations. With different parts of the network impacting each other, it is important to eliminate ambiguity or redundancy in the recommendations. One way to eliminate or reduce such ambiguity is by aggregating or correlating behavior into groups. Here, QoE is associated with recommendations to capture evolving nature of broadband networks (e.g., new applications, new mobile devices, new complex home-networks).

The embodiments describe method and apparatus for improving broadband experience using cloud based recommendation engine. In one embodiment, a method is provided which is performed by a computing device for controlling home network system associated with a plurality of Wi-Fi communicating devices. In one embodiment, the method comprises analyzing operational data associated with the plurality of Wi-Fi communicating devices. In one embodiment, the operational data is collected from a plurality of Wi-Fi communicating devices. For example, downloadable agents in the Wi-Fi devices collect data and send that data to the cloud. In one embodiment, the method further comprises providing (or generating) recommendations for users of the broadband service for improving performance of the home network system according to the analyzed operational data. In one embodiment, the method comprises correlating the recommendations into groups, and aggregating the recommendations from the groups to generate unified recommendations for improving the home network system. The unified recommendations are then provided to a user of the home network system.

The term "Local Area Network" (LAN) generally refers to a computer or communication network that interconnects computers or communication devices in a limited area such as a home, school, computer laboratory, or office building using network media.

The term "Wide Area Network" (WAN) generally refers to a telecommunication network that covers a broad area (i.e., any network that links across metropolitan, regional, or national boundaries) compared to the limited area covered be a LAN.

The term "performance" generally refers to any one or more of network throughput (e.g., TCP/UDP), latency, jitter, connectivity, error rates, power consumption, transmit power, coverage, security, etc. Improving performance of the communication system includes increasing throughput, reducing error rate and latency, improving (i.e., reducing) jitter, reducing power consumption, increasing area of coverage, enhancing network security, etc. for the communicating system.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" generally refers to two or more elements which are in direct contact (physically, electrically, magnetically, electromagnetically, optically, etc.). The term "coupled" generally may also refer to two or more elements that are not in direct contact with each other, but still cooperate or interact with each other.

Unless otherwise specified, the use of the ordinal adjectives "first," "second," and "third," etc., to describe a common object, merely indicates that different instances of like objects are being referred to, and are not intended to imply that the objects so described must be in a given sequence, either temporally, spatially, in ranking or in any other manner.

Figure 1:
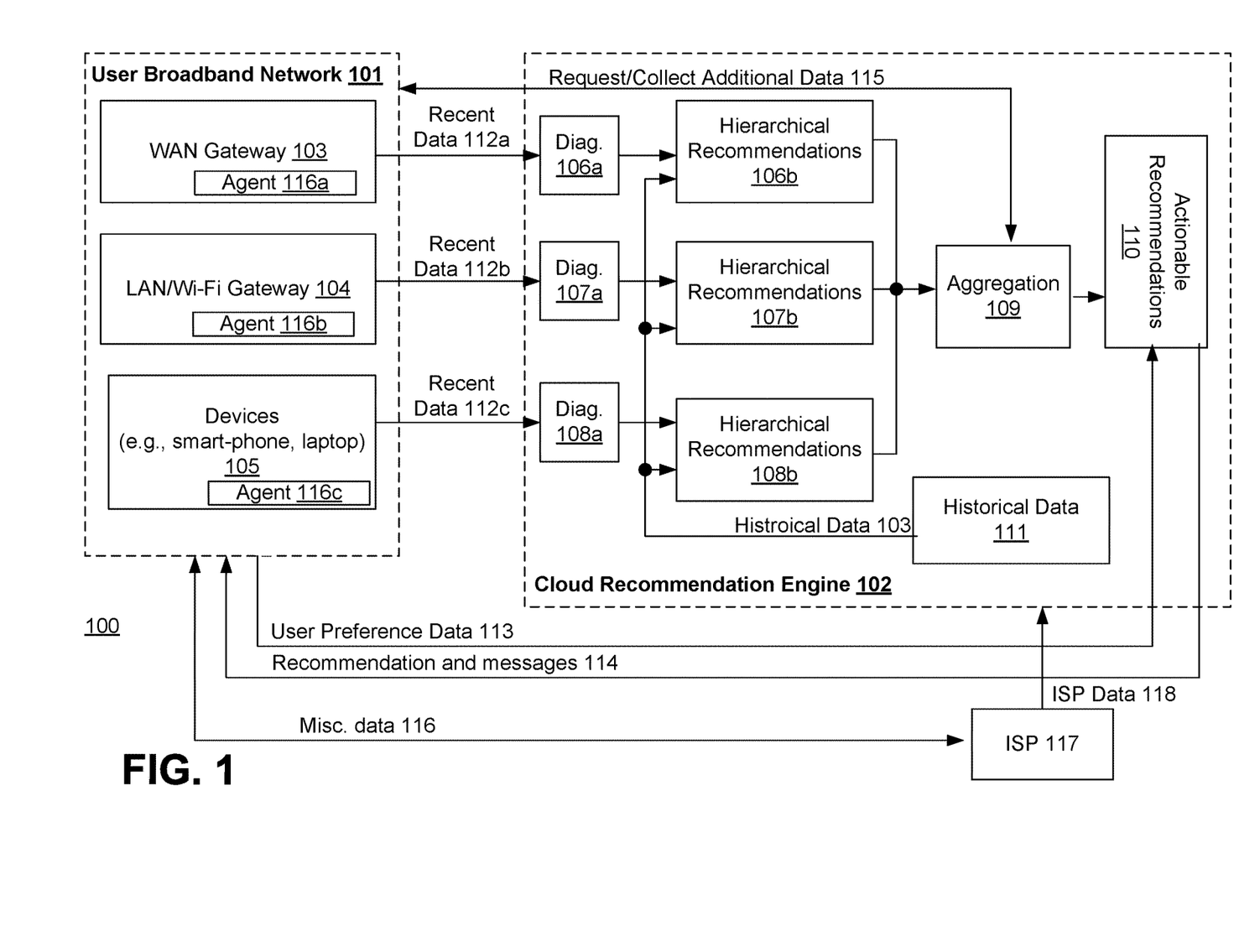
FIG. 1 illustrates a communication network having an apparatus for improving broadband experience, according to one embodiment of the disclosure.

FIG. 1 illustrates a communication network 100 having an apparatus for improving broadband experience, according to one embodiment of the disclosure. In one embodiment, communication network 100 comprises User Broadband Network 101, Cloud Recommendation Engine 102, and Information Service Provider (ISP) 117. In one embodiment, User Broadband Network 101 comprises one or more Wi-Fi enabled devices. For example, User Broadband Network 101 includes a WAN Gateway 103, LAN/Wi-Fi Gateway 104, and Devices 105 such as smart-phone, laptop, tablets, etc. In one embodiment, Cloud Recommendation Engine 102 includes various logics including logic 106a, 107a, and 108a to provide individual diagnostics (Diag.) and recommendations associated with WAN Gateway 103, LAN/Wi-Fi Gateway 104, and Devices 105 respectively. In one embodiment, logics 106b, 107b, and 108b define hierarchies for the recommendations generated by 106a, 107a, and 108a, respectively, to generate hierarchical recommendations. Hierarchical recommendations are targeted to a specific Wi-Fi communication device and are defined based on the inclusiveness of the respective communication element (e.g., AP (Access Point) serves stations and so AP has a higher hierarchy than stations). They are hierarchical, since they are at different layers within the system i.e., Wi-Fi device, Wi-Fi AP, Broadband, etc. The hierarchy may be important in the grouping or aggregating process, since problems in the higher level (i.e., network) may have higher priority than the problems in lower level (i.e., station).

In one embodiment, Cloud Recommendation Engine 102 comprises Aggregation Logic 109 and Logic 110 to provide Actionable Recommendations. In one embodiment, Historical data is stored in memory 111 (or database) in Cloud Recommendation Engine 102. In one embodiment, Cloud Recommendation Engine 102 resides in a server. In one embodiment, Cloud Recommendation Engine is coupled to DSLAMs in the ISP 117 to learn more about the DSL performance. ISP 116 may collect performance data 116 from User Broadband Network 101 to monitor the internet service being provided to the User Broadband Network 101. In one embodiment, Cloud Recommendation Engine 102 retrieves DSL data (in ISP Data 118) from the DSLAMs in ISP 117 to learn about the DSL performance and to use that data to form Recommendations and messages 114.

In one embodiment, Cloud Recommendation Engine 102 gathers Recent Data 112a/b/c from User Broadband Network 101. In one embodiment, the communication devices in User Broadband Network 101 have corresponding agents that collect Wi-Fi, DSL, Broadband, coaxial cable, optic cable, and/or device data, and then provide that data as Recent Data to Cloud Recommendation Engine 102. For example, Agent 116a in WAN Gateway 103 collects DSL, Broadband, and/or device data and sends that information to Cloud Recommendation Engine 102. Here, Agent refers to a downloadable application or existing hardware that collects various types of data and allows communication with Cloud Recommendation Engine 102.

In one embodiment, Agent 116a periodically sends collected data to Cloud Recommendation Engine 102. For example, Agents 116/a/b/c may send data to Cloud Recommendation Engine 102 at night. In one embodiment, Agent 116a sends data to the Cloud Recommendation Engine 102 immediately when a certain event happens. For example, if the station that needs a continuous connection is disconnected, the agent can send a notification/data to the Cloud Recommendation Engine 102 right away to indicate that the station is disconnected. In one embodiment, Agents 116/a/b/c send data automatically to Cloud Recommendation Engine 102 at a predetermined time(s) or periodically without user interaction. In one embodiment, User of the User Broadband Network 101 may initiate data collection by Agents 116a/b/c. In one embodiment, Cloud Recommendation Engine 102 requests Agent 116a to send the most recent data collected by WAN Gateway 103 so Cloud Recommendation Engine 102 may analyze it and provide recommendations to the user. In one embodiment, Agent 116b in LAN/Wi-Fi Gateway 104 collects Wi-Fi and/or device data and sends that information to Cloud Recommendation Engine 102 for analysis. In one embodiment, Cloud Recommendation Engine 102 collects data from Internet Service Providers (ISPs) 117. In one embodiment, based on Recommendations and messages 114 from Cloud Recommendation Engine 102, data collection policy of Agents 116a/b/c or applications in the devices may change. For example, if Cloud Recommendation Engine 102 suggests automatic optimization of broadband service, then user may initiate the optimization process and Agents 116a/b/c may collect data more frequently.

The data collected by Agents 116a/b/c include one or more of data of Wi-Fi performance counters, Wi-Fi operational data, Wi-Fi active probing data, Wi-Fi user traffic data, DSL operational data, broadband performance data, and device operational data (e.g., amount of free memory, processor load, etc.). In one embodiment, Agents 116a/b/c also collect User Preference Data 113 that indicate user's preference of using the devices in User Broadband Network 101. Examples of user preference include: monitoring broadband connectivity of home security devices more frequently than usual, and sending immediate alerts to the user when there are connectivity issues with any of those home security devices. Another examples of user preference is monitoring and alerting the user when a specified device or devices generate activity in the night. In one embodiment, this User Preference Data 113 is provided to logic 110 associated with providing Actionable Recommendations so that logic 110 generates Recommendation and messages 114 in view of User Preference Data 113 and aggregated data from logic 109.

In one embodiment, Cloud Recommendation Engine 102 maintains a database (in a memory) of Historical Data 111 and benchmarks. For example, the database of Historical Data 111 includes data such as maximum achieved speed for a device in User Broadband Network 101, maximum throughput capacity of for a device in the User Broadband Network 101, device-type, authorization history, etc. In one embodiment, after Recent Data 112*a/b/c* is received by Cloud Recommendation Engine 102, Logics 106, 107, and 108 develop Hierarchical Recommendations for corresponding devices in User Broadband Network 101 using Recent Data 112*a/b/c* and Historical Data 103. In one embodiment, Logics 106, 107, and 108 generate diagnostics and targeted recommendations, set priority levels, and action levels for individual recommendations. Here, diagnostics includes throughput, connectivity, latency, coverage, traffic, incorrect setting, noise, transmitter error, driver problems, and broadband per AP, etc.

In one embodiment, Logic 109 receives Hierarchical Recommendations from Logics 106, 107, and 108 and aggregates the recommendations into groups based on priority, action-levels, and correlations between recommendations. In one embodiment, Logic 109 may Request/Collect Additional Data 115 from User broadband Network 101 to assist with categorizing the recommendations. Aggregated recommendations include recommendations to enable optimization, improve coverage for devices, restart Wi-Fi driver, enable Wi-Fi security, etc. In one embodiment, recommendations are categorized by Logic 109 which include groups such as manual real-time recommendations (e.g., recommendations for real-time fixes that user can execute), automatic long-term recommendations (e.g., signing up for services such as optimization that automatically fixes the broadband problems), one-time permanent recommendations (e.g., recommendations to upgrade device, router, or broadband service), and generic recommendations (e.g., recommendation to user to contact service provider).

In one embodiment, aggregated recommendations are received by Logic 110 that generates actionable Recommendations and messages 114 in view of User Preference Data 113. In one embodiment, Logic 110 integrates User Preference Data 113 to set alert levels and to categorize the types of fixes. In one embodiment, user QoE is generated based on diagnostics. In one embodiment, QoE is used to set the priority level of recommendations, and/or to decide recommendations. In one embodiment, depending on the priority levels or categorization of recommendations, Cloud Recommendation Engine 102 may use one of many ways to provide recommendations to the user. For example, Cloud Recommendation Engine 102 may provide daily (or at any fixed frequency) recommendations of actions for non-urgent issues, Cloud Recommendation Engine 102 may provide alerts or notifications to users through the Agents 116*a/b/c* or through any other communication channel, Cloud Recommendation Engine 102 may provide customized recommendations according to User Preference Data 113, etc.

Figure 2:
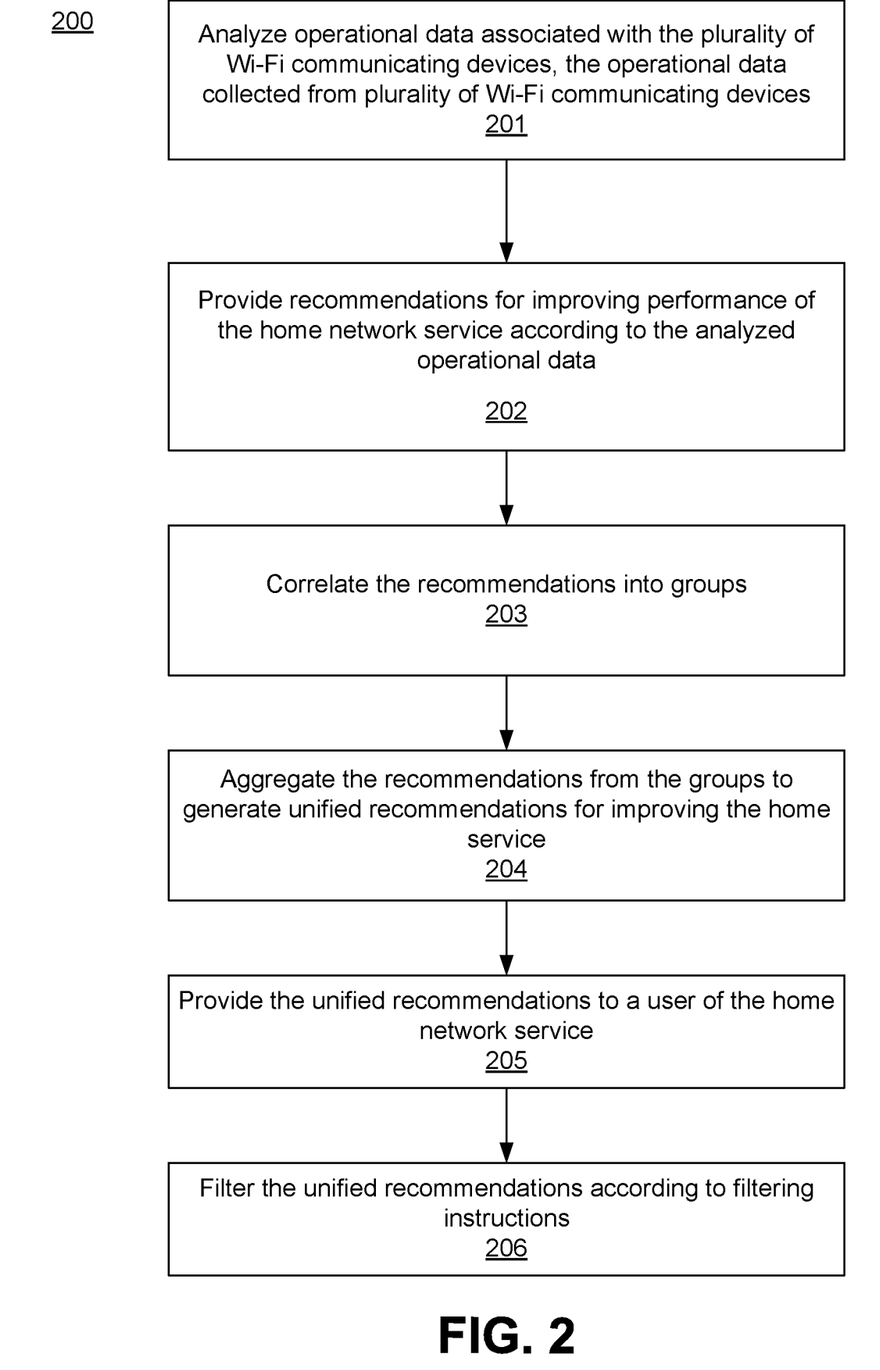
FIG. 2 illustrates a method for improving broadband experience, according to one embodiment of the disclosure.

FIG. 2 illustrates a method 200 for improving broadband experience, according to one embodiment of the disclosure. Although the blocks in the flowcharts with reference to FIG. 2 are shown in a particular order, the order of the actions can be modified. Thus, the illustrated embodiments can be performed in a different order, and some actions/blocks may be performed in parallel. Some of the blocks and/or operations listed in FIG. 2 are optional in accordance with certain embodiments. The numbering of the blocks presented is for the sake of clarity and is not intended to prescribe an order of operations in which the various blocks must occur. Additionally, operations from the various flows may be utilized in a variety of combinations. FIG. 2 is explained with reference to FIG. 1.

At block 201, operational data associated with the plurality of Wi-Fi communicating devices is analyzed. In one embodiment, the operational data is collected from the plurality of Wi-Fi communicating devices.

At block 202, recommendations for improving performance of the home network systems are provided according to the analyzed operational data. In one embodiment, individual elements are diagnosed by logics 106*a*, 107*a*, and 108*a* to provide individual recommendations. For example, each communication element in the home network (e.g., Wi-Fi station, Wi-Fi link, Wi-Fi AP, CPE (customer premises equipment), Broadband, etc.) is diagnosed individually to generate individual recommendations. In one embodiment, the diagnosis of an element (e.g. Station A diagnosis by logic 108*a*) is performed independently of other elements in the same network (e.g. AP, Station B). In one embodiment, the recommendations for an element (e.g. Recommendations 108*a* for Station A) are generated only from the diagnostic results of that element (e.g. Station A). In one embodiment, diagnostics includes throughput, connectivity, latency, coverage, traffic, incorrect setting, noise, transmitter error, driver problem, etc.

In one embodiment, after individual recommendations are collected, hierarchies for individual recommendations are defined by logics 106*b*, 107*b*, and 108*b*. Hierarchies are defined for the individual recommendations to define their level of importance, for example. In one embodiment, the individual recommendations are classified into hierarchies based on their inclusiveness: station recommendations are at the lowest level of inclusiveness, followed by the link/network (recommendations for a network will cover for station problems as well), followed by the CPE/AP and so on. The problems at higher-level in the network may mostly trickle down to lower-levels of the network and so understanding the role of the different communication elements in the network is used for defining the hierarchy. For example, Wi-Fi AP serves as the gateway for all Wi-Fi stations and hence is at a higher hierarchy (an AP fix might cover for all stations.) Consequently, recommendations to resolve AP driver problems are at a higher hierarchy compared to station performance recommendations since addressing the AP recommendations may also resolve the station problems.

At block 203, recommendations are correlated into groups. In one embodiment, after defining the hierarchies, the generated hierarchical recommendations are grouped and/or correlated for generating aggregated recommendations. At block 204, the recommendations from the groups are aggregated to generate unified recommendations for improving the home service. At block 205, the unified recommendations are provided to a user of the home network system.

The unified recommendations are final actionable recommendations that are provided to the user. To generate the unified recommendations, the hierarchical recommendations are consolidated. In one embodiment, similar recommendations are grouped. For example, if Station A's and AP's recommendations specify to enable optimization, then those recommendations are grouped. In one embodiment, correlated recommendations are grouped. For example, if Station A has low throughput and AP has driver-problems, then associated recommendation can be correlated since AP is servicing the stations. In one embodiment, redundant recommendations and proposed fixes are eliminated from the groups by applying the pre-defined hierarchies. For example, higher-level recommendations may suppress lower-level recommendations. One reason for generating the unified recommendation is to present to the user the minimum set of recommendations that will resolve all of the network problems.

In one embodiment, instead of providing the unified recommendations to a user of the home network system, the unified recommendations are automatically (or periodically) incorporated for the home network system without interaction of a user. For example, the unified recommendations are provided to one or more of diagnostic system, LAN device, performance optimization system, or home network controller. At block 206, the unified recommendations are filtered according to filtering instructions.

Method 200 may be used to restrict low performing stations (or AP devices) to enhance the experience of high-speed devices in User Broadband Network 101, according to one embodiment. Low throughput devices within User Broadband Network 101 may have a bigger impact on the performance of all devices operating on the Wi-Fi network. For example, in Wi-Fi networks, an active but low-speed device may degrade the speed of other high-speed devices on the network that are simultaneously trying to access the shared communications channel. Here, speed refers to speed associated with network traffic. In such an example, Cloud Recommendation Engine 102 may alert the user to send Recommendations and message 114 to restrict the access for the low-speed devices when high-speed devices are being used actively. This recommendation from Cloud Recommendation Engine 102 may free up the busy network from slow speed devices to provide better Wi-Fi user experience for high speed devices.

Method 200 may be used to prioritize the components that need fixing, according to one embodiment. For example, when multiple devices in User Broadband Network 101 are experiencing poor connectivity due to router, DSL modem, or broadband link, Cloud Recommendation Engine 102 may identify the issue and consolidate the recommendation for the user to target the root-cause of the problem i.e., the DSL modem, or broadband link. In one embodiment, when only certain devices in User Broadband Network 101 are experiencing problems with the broadband network, recommendations to fix those individual devices in User Broadband Network 101 may take priority over other recommendation.

Method 200 may also be used to block rogue devices from gaining access to the Wi-Fi network. In one embodiment, Cloud Recommendation Engine 102 maintains an historical log in Logic 111 to flag or identify rogue devices. For example, Cloud Recommendation Engine 102 maintains a flag for each device connected to the Wi-Fi network, where the flag indicates whether the device is an authorized device. In one embodiment, when Cloud Recommendation Engine 102 identifies that one of the devices on the network is a rogue device (as determined by the value of the flag associated with that device), Cloud Recommendation Engine 102 may message the user about the rogue device, and may also request the rogue device to verify its identity with the Cloud Recommendation Engine 102 in case the flag setting associated with that device is false. If it is determined that the flag setting associated with the device is correct (i.e., the device is indeed rogue) then Cloud Recommendation Engine 102 Agent 116a and/or Agent 116b can block that device from attempting to connect to the Wi-Fi network, thus securing the Wi-Fi network.

Method 200 may also be used to monitor infrastructure changes, for example, when a new router, device, service, is incorporated. Users tend to periodically upgrade routers, devices, and services for various reasons. In one embodiment, Cloud Recommendation Engine 102 maintains historical benchmarks for performance metrics (e.g., maximum throughput, lowest latency, highest signal strength). In one embodiment, Cloud Recommendation Engine 102 compares Recent Data 112a/b/c to identify whether recent changes in infrastructure of User Broadband Network 101 are causing significant changes (e.g., slowness) in the broadband service. Upon determining that the new changes in infrastructure are slowing down the network, Cloud Recommendation Engine 102 may recommend User to restore previous wireless router because the new router is achieving lower maximum speeds for several devices in User Broadband Network 101.

Method 200 may also be used for assigning devices and applications, according to one embodiment. For example, Cloud Recommendation Engine 102 may provide certain recommendations for certain devices in User Broadband Network 101. In one embodiment, when multiple wireless routers are deployed in the User Broadband Network 101, Cloud Recommendation Engine 102 may recommend user to use the router with higher capabilities (e.g., 11AC, dual-band router) for devices with similar capabilities and for devices that are used for high-bandwidth applications (e.g., smart-TV, gaming-console). In one embodiment, Cloud Recommendation Engine 102 recommends for the best device (in terms of speed) and network combination when multiple wireless networks are available for broadband access.

Method 200 may also be used for providing continuous connectivity of secure devices, according to one embodiment. For example, Cloud Recommendation Engine 102 may ensure that certain devices such as smoke detector, fire alarm, burglary alarm, thermostats, surveillance cameras, etc., are always connected with the Wi-Fi network. In one embodiment, Cloud Recommendation Engine 102 may monitor connectivity of these special devices and provide alerts to the user if any one of these devices stops contacting Cloud Recommendation Engine 102 for more than a predetermined time period (e.g., 1 hour). While the above applications are exemplary applications, other applications may be used with various embodiments described here.

Figure 3:
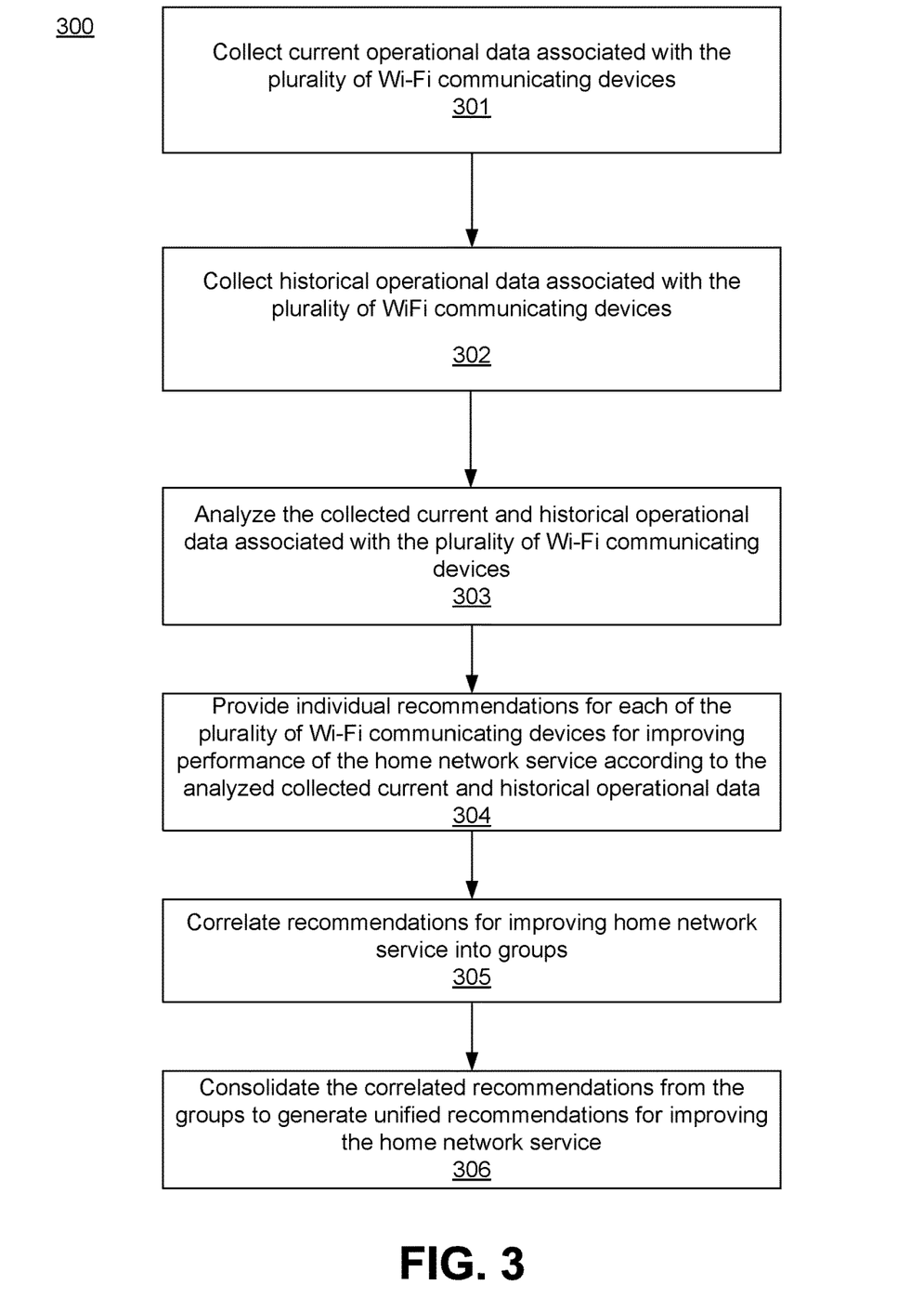
FIG. 3 illustrates a method for improving broadband experience, according to another embodiment of the disclosure.

FIG. 3 illustrates a method 300 for improving broadband experience, according to another embodiment of the disclosure. Although the blocks in the flowcharts with reference to FIG. 3 are shown in a particular order, the order of the actions can be modified. Thus, the illustrated embodiments can be performed in a different order, and some actions/blocks may be performed in parallel. Some of the blocks and/or operations listed in FIG. 3 are optional in accordance with certain embodiments. The numbering of the blocks presented is for the sake of clarity and is not intended to prescribe an order of operations in which the various blocks must occur. Additionally, operations from the various flows may be utilized in a variety of combinations. FIG. 3 is described with reference to FIG. 1.

At block 301, current operational data associated with the plurality of Wi-Fi communicating devices is collected. At block 302, historical operational data associated with the plurality of Wi-Fi communicating devices is collected. At block 303, the collected current and historical operational data associated with the plurality of Wi-Fi communicating devices is analyzed. At block 304, individual recommendations are provided for each of the plurality of Wi-Fi communicating devices for improving performance of the home network systems according to the analyzed collected current and historical operational data. At block 305, recommendations are correlated into groups for improving home network systems. At block 306, the correlated recommendations from the groups are consolidated to generate unified recommendations for improving the home network system. The various applications discussed with reference to method 300 are also applicable for method 400.

Figure 4:
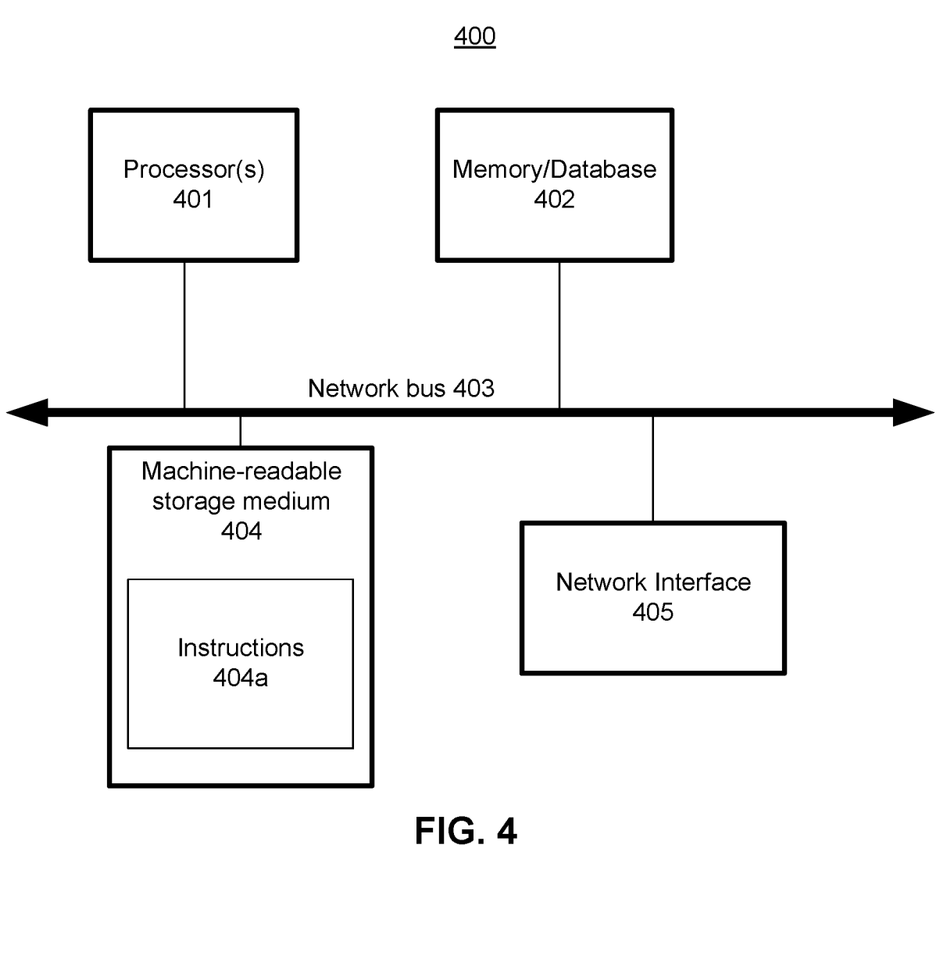
FIG. 4 is a processor-based system having machine-readable storage medium with computer executable instructions to perform the processes and methods, according to one embodiment of the disclosure.

FIG. 4 is a processor-based system 400 having machine-readable storage medium with computer executable instructions to perform the processes and methods, according to one embodiment of the disclosure. In one embodiment, processor-based system 400 comprises a processor(s) 401, memory/database 402, network bus 403, machine-readable storage medium 404, and network interface 405. In one embodiment, processor-based system 400 is part of one or more devices in User Broadband Network 101. In one embodiment, processor-based system 400 is part of the server having the Cloud Recommendation Engine 102.

In one embodiment, machine-readable storage medium 404 and associated computer executable instructions 404*a* may be in any of the communication devices and/or servers discussed herein. The computer-machine-readable/executable instructions 404*a* are executed by processor 401. Elements of embodiments are provided as machine-readable medium for storing the computer-executable instructions (e.g., instructions to implement the flowcharts and other processes discussed in the description).

In one embodiment, database 402 is operable to store data used by the instructions 404*a* (also called software code/instructions). In one embodiment, network interface 405 is operable to communicate with other devices. In one embodiment, the components of processor-based system 400 communicate with one another via network bus 403.

The machine-readable storage medium 904 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Program software code/instructions 404*a* executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software." The program software code/instructions 404*a* typically include one or more instructions stored at various times in various tangible memory and storage devices in or peripheral to the computing device, that, when fetched/read and executed by the computing device, as defined herein, cause the computing device to perform functions, functionalities and operations necessary to perform a method, so as to execute elements involving various aspects of the function, functionalities, and operations of the method(s) forming an aspect of the disclosed subject matter.

For the purposes of this disclosure a module is a software, hardware, or firmware (or combinations thereof) system, process or functionality, or component thereof, that performs or facilitates the processes, features, and/or functions, functionalities and/or operations described herein (with or without human interaction or augmentation) as being performed by the identified module. A module can include sub-modules. Software components of a module may be stored on a tangible machine readable medium (e.g., 404). Modules may be integral to one or more servers, or be loaded and executed by one or more servers. One or more modules may be grouped into an engine or an application.

A tangible machine readable medium (e.g., 404) can be used to store program software code/instructions (e.g., 404*a*) and data that, when executed by a computing device 400, cause the computing device 900 to perform a method(s) as may be recited in one or more accompanying claims directed to the disclosed subject matter. The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in a same communication session.

The software program code/instructions and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, a tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, (e.g., an iPhone®, Blackberry® Droid®,) or the like, or any other device including a computing device. In one embodiment, processor-based system 900 is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

The following examples pertain to further embodiments. Specifics in the examples may be used anywhere in one or more embodiments. All optional features of the apparatus described herein may also be implemented with respect to a method or process.

For example, a method performed by a computing device for controlling home network system associated with a plurality of Wi-Fi communicating devices is provided. In one embodiment, the method comprises: analyzing operational data associated with the plurality of Wi-Fi communicating devices, the operational data collected from plurality of Wi-Fi communicating devices; providing (or generating) recommendations for improving performance of the home network system according to the analyzed operational data; correlating the recommendations into groups; and aggregating the recommendations from the groups to generate unified recommendations for improving the home network system.

In one embodiment, the method further comprises: providing the unified recommendations to a user of the home network system. In one embodiment, the method further comprises providing the unified recommendations to one or more of: a diagnostic system, a LAN device, a performance optimization system, or a home network controller. In one embodiment, the method further comprises: filtering the unified recommendations according to filtering instructions; and providing the filtered recommendations to a user of the home network system. In one embodiment, the correlating is performed according to similarities in recommendations for improving performance of the home network system associated with the plurality of Wi-Fi communicating devices. In one embodiment, the collected operational data is collected by an agent in an AP or mobile application. In one embodiment, the home network systems are one of: a broadband service; or a Wi-Fi service.

In another example, a computer readable storage medium is provided having computer executable instructions stored thereon, that when executed by a processor, causes the processor to perform a method described above.

In another example, a method provided which is performed by a computing device for providing (or generating) recommendations to improve home network system associated with a plurality of Wi-Fi communicating devices. The method comprises: collecting, by the computing device, current operational data associated with the plurality of Wi-Fi communicating devices; collecting, by the computing device, historical operational data associated with the plurality of Wi-Fi communicating devices; analyzing the collected current and historical operational data associated with the plurality of Wi-Fi communicating devices; providing (or generating) individual recommendations for each of the plurality of Wi-Fi communicating devices for improving performance of the home network system according to the analyzed collected current and historical operational data; defining hierarchies for the individual recommendations for each of the plurality of Wi-Fi communication devices; correlating recommendations for improving home network system into groups; and consolidating the correlated recommendations from the groups to generate unified recommendations for improving the home network system.

In one embodiment, the hierarchies for individual recommendations are defined based on a level of inclusiveness of the respective Wi-Fi communication device. In one embodiment, the method further comprises: providing the unified recommendations to a user of the home network system. In one embodiment, the method further comprises: filtering the unified recommendations according to filtering instructions; and providing the filtered recommendations to a user of the home network system.

In one embodiment, the correlating is performed according to similarities in recommendations for improving performance of the home network system associated with the plurality of Wi-Fi communicating devices. In one embodiment, the collected current operational data is collected by an agent in an AP or mobile application. In one embodiment, the home network systems are one of: a broadband service; or a Wi-Fi service.

In another example, a computer readable storage medium having computer executable instructions stored thereon, that when executed by a processor, causes the processor to perform a method according to the method discussed above.

In another example, an apparatus is provided for controlling home network system. In one embodiment, the apparatus is comprises: logic to analyze operational data associated with the plurality of Wi-Fi communicating devices, the operational data collected from plurality of Wi-Fi communicating devices; logic to provide (or to generate) recommendations for improving performance of the home network system according to the analyzed operational data; logic to correlate the recommendations into groups; and logic to aggregate the recommendations from the groups to generate unified recommendations for improving the home network system.

In one embodiment, the apparatus further comprises: logic to provide the unified recommendations to a user of the home network system. In one embodiment, the apparatus further comprises: logic to filter the unified recommendations according to filtering instructions; and logic to provide the filtered recommendations to a user of the home network system. In one embodiment, the collected operational data is collected by an agent in an AP or mobile application. In one embodiment, the home network systems are one of: a broadband service; or a Wi-Fi service.

In another example, a system is provided which comprises: a database to store historical data; a server coupled to the database, the server operable to: analyze operational data associated with a plurality of Wi-Fi communicating devices, the operational data collected from plurality of Wi-Fi communicating devices; analyze the historical data from the database; provide (or generate) recommendations for improving performance of the home network system according to the analyzed operational data and historical data; correlate the recommendations into groups; and aggregate the recommendations from the groups to generate unified recommendations for improving the home network system; and wireless interface for allowing the server to communicate with one or more of the plurality of Wi-Fi communicating devices. In one embodiment, the server is further operable to: provide the unified recommendations to a user of the home network system via the wireless interface.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A method performed by a computing device for controlling home network system associated with a plurality of Wi-Fi communicating devices, the method comprising:
   analyzing operational data associated with the plurality of Wi-Fi communicating devices, the operational data collected from the plurality of Wi-Fi communicating devices, wherein the operational data comprises current operational data and historical operational data;
   providing individual recommendations for each of the plurality of Wi-Fi communicating devices for improving performance of the home network system according to the analyzed operational data;
   defining hierarchies for the individual recommendations for each of the plurality of Wi-Fi communication devices;
   correlating the individual recommendations into groups; and
   aggregating the individual recommendations from the groups to generate unified recommendations for improving the home network system.

2. The method of claim 1 further comprising:
   providing the unified recommendations for a user of the home network system.

3. The method of claim 1 further comprising providing the unified recommendations to one or more of:
   a LAN device,
   a performance optimization system, or
   a home network controller.

4. The method of claim 1 further comprising:
   filtering the unified recommendations according to filtering instructions; and
   providing the filtered unified recommendations to a user of the home network system.

5. The method of claim 1, wherein the correlating is performed according to similarities in the individual recommendations for improving performance of the home network system associated with the plurality of Wi-Fi communicating devices.

6. The method of claim 1, wherein the collected operational data is collected by an agent in an AP or mobile application.

7. The method of claim 1, wherein the home network system is one of:
   a broadband service; or
   a Wi-Fi service.

8. A method performed by a computing device for providing recommendations to improve home network system associated with a plurality of Wi-Fi communicating devices, the method comprising:
   collecting, by the computing device, current operational data associated with the plurality of Wi-Fi communicating devices;
   collecting, by the computing device, historical operational data associated with the plurality of Wi-Fi communicating devices;
   analyzing the collected current and historical operational data associated with the plurality of Wi-Fi communicating devices;
   providing individual recommendations for each of the plurality of Wi-Fi communicating devices for improving performance of the home network system according to the analyzed collected current and historical operational data;
   defining one or more hierarchies for the individual recommendations for each of the plurality of Wi-Fi communicating devices;
   correlating the individual recommendations for improving home network system into groups; and
   consolidating the individual correlated recommendations from the groups—to generate unified recommendations for improving the home network system.

9. The method of claim 8, wherein the one or more hierarchies for the individual recommendations are targeted to a specific Wi-Fi communication device and are defined based on a level of inclusiveness of a corresponding communication element in a broadband network and the home network system.

10. The method of claim 8 further comprising:
    providing the unified recommendations to a user of the home network system.

11. The method of claim 8 further comprising:
    filtering the unified recommendations according to filtering instructions; and
    providing the filtered unified recommendations to a user of the home network system.

12. The method of claim 8, wherein the correlating is performed according to similarities in the individual recommendations for improving the performance of the home network system associated with the plurality of Wi-Fi communicating devices.

13. The method of claim 8, wherein the collected current operational data is collected by an agent in an AP or mobile application.

14. The method of claim 8, wherein the home network system is one of:
    a broadband service; or
    a Wi-Fi service.

15. A non-transitory computer readable storage medium having computer program code stored thereon, the computer program code, when executed by one or more processors implemented on a computing system, causes the computing system to perform a method comprising:
    analyzing operational data associated with a plurality of Wi-Fi communicating devices, the operational data collected from the plurality of Wi-Fi communicating devices, wherein the operational data comprises current operational data and historical operational data;

providing individual recommendations for each of the plurality of Wi-Fi communicating devices for improving performance of a home network system according to the analyzed operational data;

defining hierarchies for the individual recommendation for each of the plurality of Wi-Fi communication devices;

correlating the individual recommendations into groups; and aggregating the individual recommendations from the groups to generate unified recommendations for improving the home network system.

16. The non-transitory computer readable storage medium of claim 15 further comprising:

providing the unified recommendations to a user of the home network system.

17. The non-transitory computer readable storage medium of claim 16 further comprising:

filtering the unified recommendations according to filtering instructions; and providing the filtered unified recommendations to a user of the home network system.

18. The non-transitory computer readable storage medium of claim 16, wherein the collected operational data is collected by an agent in an AP or mobile application.

19. The non-transitory computer readable storage medium of claim 16, wherein the home network system is one of:

a broadband service; or a Wi-Fi service.

20. A system comprising:

a database to store historical data;

a server coupled to the database, the server operable to:

analyze operational data associated with a plurality of Wi-Fi communicating devices, the operational data collected from plurality of Wi-Fi communicating devices;

analyze the historical data from the database;

provide individual recommendations based on hierarchical recommendation functions for each of the plurality of Wi-Fi communicating devices for improving performance of a home network system according to the analyzed operational data and historical data;

correlate the individual recommendations into groups; and aggregate the individual recommendations from the groups to generate unified recommendations for improving the home network system; and a wireless interface for allowing the server to communicate with one or more of the plurality of Wi-Fi communicating devices.

21. The system of claim 20, wherein the server is further operable to:

provide the unified recommendations to a user of the home network system via the wireless interface.

22. The system of claim 20, wherein the server comprises a cloud recommended engine that comprises:

one or more individual diagnostic functions that provide individual diagnostics based on recent data associated with one or more corresponding WAN Gateway, LAN/Wi-Fi Gateway, and other devices; and an aggregation function that aggregates the individual recommendations for specific Wi-Fi communicating devices into the groups based on priority, action-levels, and correlations between the individual recommendations.

23. The system of claim 22, wherein each one or more corresponding WAN Gateway, LAN/Wi-Fi Gateway, and other devices comprise an agent that is operable to send data to a data cloud.

* * * * *